United States Patent
Dobashi

(10) Patent No.: US 12,307,143 B2
(45) Date of Patent: May 20, 2025

(54) PRINT CONTROL DEVICE FOR UPDATING EXECUTION ORDER BY ADDING JOB RECEIVING DURING EXECUTION OF JOB BASED ON FIXATION TEMPERATURE IN UNEXECUTED JOB

(71) Applicant: CANON KABUSHIKI KAISHA, Tokyo (JP)

(72) Inventor: Yuka Dobashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/442,341

(22) Filed: Feb. 15, 2024

(65) Prior Publication Data

US 2024/0295999 A1    Sep. 5, 2024

(30) Foreign Application Priority Data

Mar. 1, 2023    (JP) .................. 2023-031117

(51) Int. Cl.
    *G06F 3/12*    (2006.01)
(52) U.S. Cl.
    CPC ............ *G06F 3/126* (2013.01); *G06F 3/1221* (2013.01)
(58) Field of Classification Search
    CPC ................................ G06F 3/126; G06F 3/1221
    USPC ......................................................... 358/1.1
    See application file for complete search history.

(56) References Cited

U.S. PATENT DOCUMENTS

| | | | | |
|---|---|---|---|---|
| 8,755,070 B2* | 6/2014 | Shimizu | ............. | G06K 15/1805 358/1.14 |
| 2007/0071465 A1* | 3/2007 | Hamby | .................. | G03G 15/20 399/45 |
| 2007/0154230 A1* | 7/2007 | Choi | .................. | G03G 15/2039 399/69 |
| 2012/0013946 A1* | 1/2012 | Imai | .................... | G03G 15/6576 358/1.15 |
| 2012/0154855 A1* | 6/2012 | Tachibana | ............ | B41J 13/0009 358/1.15 |

FOREIGN PATENT DOCUMENTS

JP    2016-110266 A    6/2016

* cited by examiner

*Primary Examiner* — Allen H Nguyen
(74) *Attorney, Agent, or Firm* — VENABLE LLP

(57) ABSTRACT

A technique in which even in a case where a new job is added during execution of job-based printing, the printing can be executed efficiently is provided. There are provided a reception unit configured to receive a job to execute printing on a print medium, an acquisition unit configured to acquire a fixation temperature for fixing a printing agent to the print medium used for the job received by the reception unit, and an update unit configured to update an execution order by adding, to an unexecuted job, a first job received by the reception unit during execution of the job according to the execution order based on the fixation temperature in the unexecuted job which is the job that has not yet been executed in the execution order and the fixation temperature in the first job acquired by the acquisition unit.

11 Claims, 9 Drawing Sheets

FIG.6A (602)

| NO. 1 | MEDIA A | 40 DEGREES |
|---|---|---|
| NO. 2 | MEDIA A | 40 DEGREES |
| NO. 3 | MEDIA B | 60 DEGREES |
| NO. 4 | MEDIA B | 60 DEGREES |
| NO. 5 | MEDIA C | 70 DEGREES |
|  |  |  |
|  |  |  |

FIG.6B

| ADDITIONAL JOB 1 | MEDIA A | 40 DEGREES |
|---|---|---|
| ADDITIONAL JOB 2 | MEDIA C | 70 DEGREES |
| ADDITIONAL JOB 3 | MEDIA D | 50 DEGREES |

FIG.6C (604)

| NO. 1 | MEDIA A | 40 DEGREES |
|---|---|---|
| NO. 2 | MEDIA A | 40 DEGREES |
| NO. 3 (ADDITIONAL JOB 1) | MEDIA A | 40 DEGREES |
| NO. 4 (ADDITIONAL JOB 3) | MEDIA D | 50 DEGREES |
| NO. 5 (OLD JOB NO. 3) | MEDIA B | 60 DEGREES |
| NO. 6 (OLD JOB NO. 4) | MEDIA B | 60 DEGREES |
| NO. 7 (OLD JOB NO. 5) | MEDIA C | 70 DEGREES |
| NO. 8 (ADDITIONAL JOB 2) | MEDIA C | 70 DEGREES |

FIG.6D (606)

| NO. 1 | MEDIA A | 40 DEGREES |
|---|---|---|
| NO. 2 | MEDIA A | 40 DEGREES |
| NO. 3 | MEDIA B | 60 DEGREES |
| NO. 4 | MEDIA B | 60 DEGREES |
| NO. 5 | MEDIA C | 70 DEGREES |
|  |  |  |
|  |  |  |

FIG.6E

| ADDITIONAL JOB A | MEDIA A | 40 DEGREES |
|---|---|---|
| ADDITIONAL JOB B | MEDIA C | 70 DEGREES |
| ADDITIONAL JOB C | MEDIA D | 50 DEGREES |

FIG.6F (608)

| NO. 1 | MEDIA A | 40 DEGREES |
|---|---|---|
| NO. 2 | MEDIA A | 40 DEGREES |
| NO. 3 | MEDIA B | 60 DEGREES |
| NO. 4 | MEDIA B | 60 DEGREES |
| NO. 5 (OLD JOB NO. 5) | MEDIA C | 70 DEGREES |
| NO. 6 (ADDITIONAL JOB B) | MEDIA C | 70 DEGREES |
| NO. 7 (ADDITIONAL JOB C) | MEDIA D | 50 DEGREES |
| NO. 8 (ADDITIONAL JOB A) | MEDIA A | 40 DEGREES |

PRINT CONTROL DEVICE FOR UPDATING EXECUTION ORDER BY ADDING JOB RECEIVING DURING EXECUTION OF JOB BASED ON FIXATION TEMPERATURE IN UNEXECUTED JOB

BACKGROUND OF THE INVENTION

Field of the Invention

The present invention relates to a print control device, a print control method, and a storage medium.

Description of the Related Art

Printing apparatuses that use heat to fix a printing agent such as ink to a print medium are conventionally known. In such printing apparatuses, a fixation temperature for fixing the printing agent on a print medium is set for each type of print medium, and heat is applied to the print medium after printing based on the fixation temperature. Japanese Patent Laid-Open No. 2016-110266 discloses a technique to rearrange execution order of a plurality of input jobs so that fixation temperatures corresponding to print media used for the jobs are in ascending or descending order in order to perform printing efficiently.

However, Japanese Patent Laid-Open No. 2016-110266 does not assume a case where a new job is added during execution of printing based on each job in the rearranged order. As a result, after all jobs are finished in the rearranged order, the added job must be executed after preheating or heat dissipation, which makes it impossible to execute efficient printing.

SUMMARY OF THE INVENTION

The present invention is made in view of the above problem and provides a technique in which even in a case where a new job is added during execution of job-based printing, the printing can be executed efficiently.

In the first aspect of the present invention, there is provided a print control device including:
a reception unit configured to receive a job to execute printing on a print medium;
an acquisition unit configured to acquire a fixation temperature for fixing a printing agent to the print medium used for the job received by the reception unit; and
an update unit configured to update an execution order by adding, to an unexecuted job, a first job received by the reception unit during execution of the job according to the execution order based on the fixation temperature in the unexecuted job which is the job that has not yet been executed in the execution order, and the fixation temperature in the first job acquired by the acquisition unit.

In the second aspect of the present invention, there is provided a print control method including:
while a job for executing printing on a print medium is executed according to an execution order, receiving a first job which is the new job;
acquiring a fixation temperature for fixing a printing agent to the print medium used for the first job received in the receiving; and
updating the execution order by adding the first job to an unexecuted job based on the fixation temperature in the unexecuted job which is the job that has not yet been executed in the execution order and the fixation temperature in the first job.

In the third aspect of the present invention, there is provided a non-transitory computer readable storage medium storing a program for causing a computer to function as a print control device, the print control device including:
a reception unit configured to receive a job to execute printing on a print medium;
an acquisition unit configured to acquire a fixation temperature for fixing a printing agent to the print medium used for the job received by the reception unit; and
an update unit configured to an update execution order by adding, to an unexecuted job, a first job received by the reception unit during execution of the job according to the execution order based on the fixation temperature in the unexecuted job which is the job that has not yet been executed in the execution order and the fixation temperature in the first job acquired by the acquisition unit.

According to the present invention, even in a case where a new job is added during execution of job-based printing, the printing can be executed efficiently.

Further features of the present invention will become apparent from the following description of exemplary embodiments with reference to the attached drawings.

BRIEF DESCRIPTION OF THE DRAWINGS

FIGS. 6A to 6F are diagrams for explaining the outline of updating of a job list;

DESCRIPTION OF THE EMBODIMENTS

An example of an embodiment of a print control device, a print control method, and a storage medium will be described in detail below with reference to the accompanying drawings. It should be noted that the following embodiments do not limit the present invention, and not all combinations of features described in the present embodiments are essential to the solution of the problem to be solved by the present invention. Further, the positions, shapes, and the like of constituents described in the embodiments are merely examples, and the scope of the present invention is not intended to be limited thereto.

First Embodiment

First, an example of a print control device according to a first embodiment will be described by taking a printing apparatus including the print control device as an example with reference to FIG. 1 to FIG. 8. In the present embodiment, the printing apparatus refers to a printing apparatus having only a printing function but is not limited to this. The printing apparatus may be, for example, a multifunction peripheral having various publicly-known functions such as the reading function of reading an image in a document and the copying function of copying the read image.

Schematic Configuration of the Printing Apparatus

Figure 1:
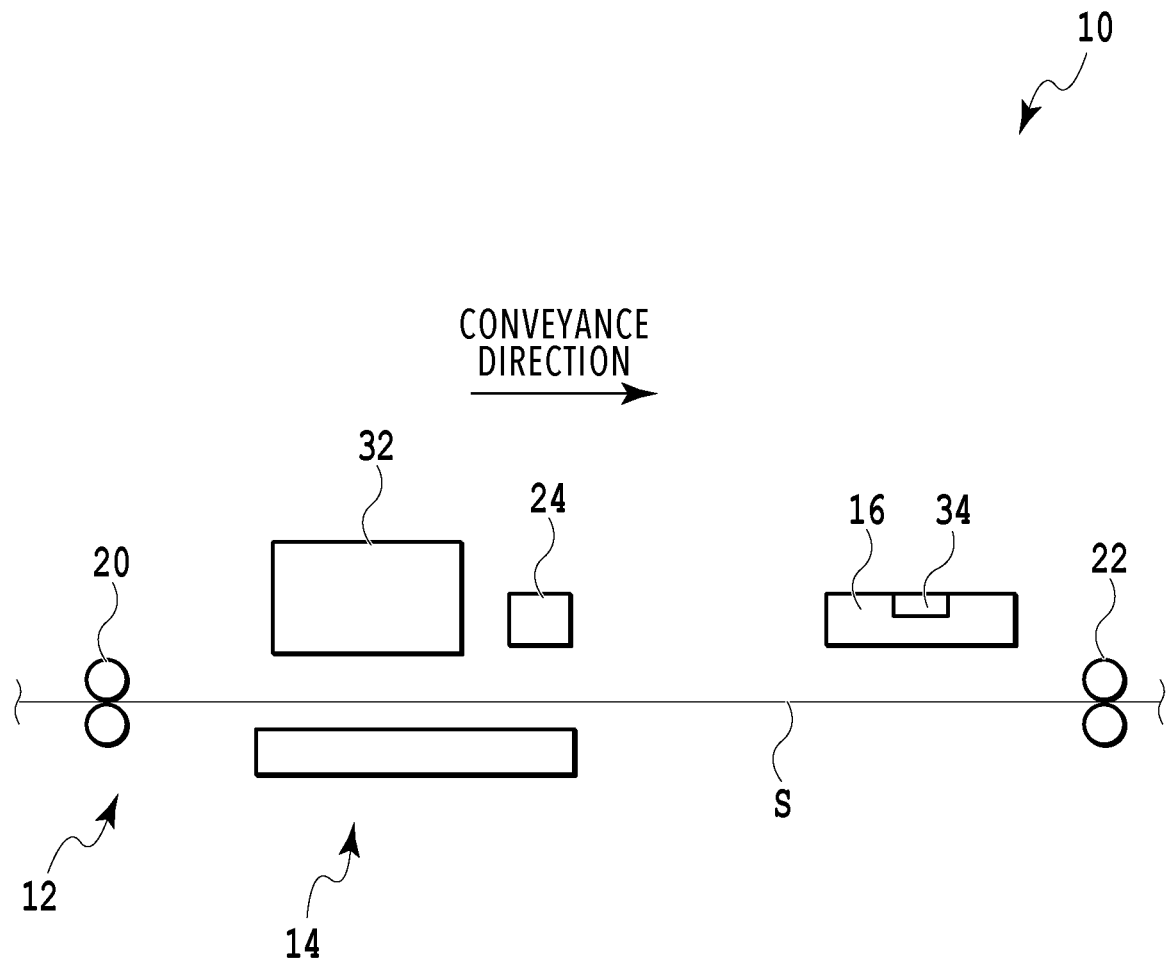
FIG. 1 is a schematic configuration diagram of a printing apparatus.
Figure 2:
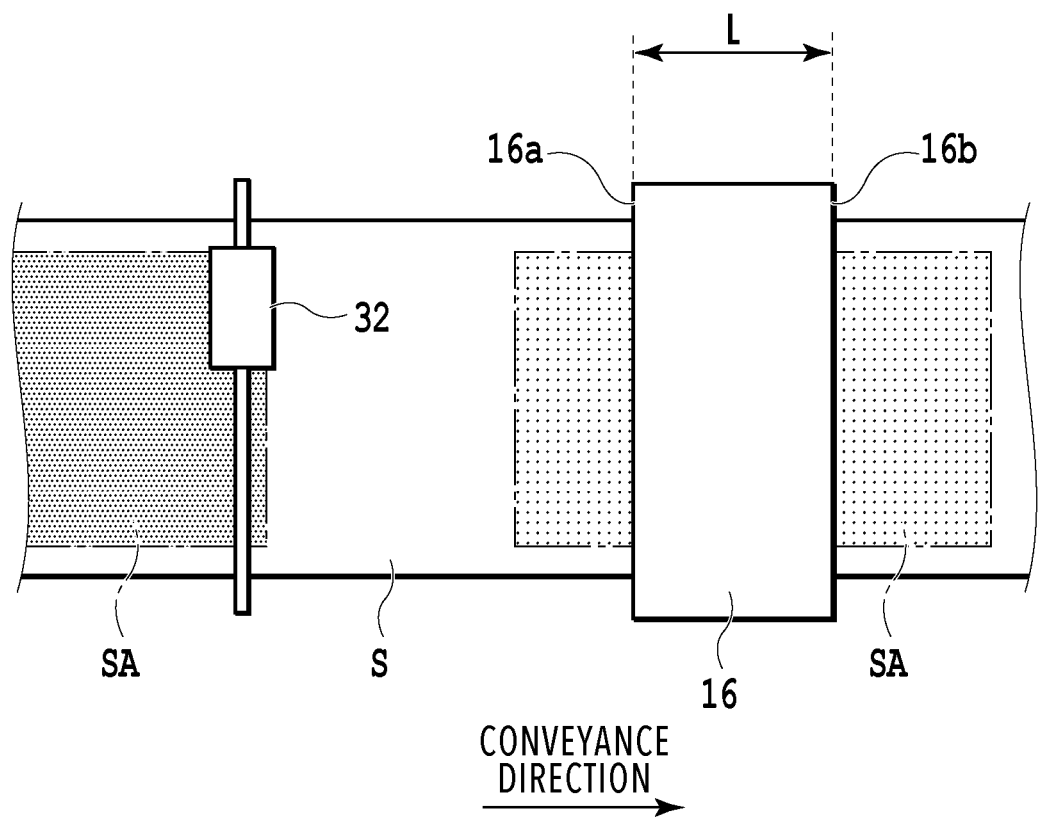
FIG. 2 is a diagram showing the relationship between a fixing portion and a print area.

FIG. 1 is a schematic configuration diagram of the printing apparatus including the print control device according to the first embodiment. FIG. 2 is a diagram for explaining the positional relationship between a print area and a fixing portion. A printing apparatus 10 in FIG. 1 includes, for example, a conveyance portion 12 that conveys a print medium S such as a cut sheet, and a printing portion 14 that performs printing by applying ink to the print medium S conveyed by the conveyance portion 12. Also, the printing portion 14 includes a fixing portion 16 that applies heat to the print medium S after printing to fix the ink applied by the printing portion 14 to the print medium S. The overall operation of the printing apparatus 10 is controlled by a control portion 300 (to be described later).

The conveyance portion 12 includes conveyance rollers 20, 22 that convey the print medium S fed from a cassette (not shown) accommodating the print medium S. In the present embodiment, the printing apparatus 10 includes a plurality of the cassettes, each of which accommodates the print media S having, for example, a different size, a different basis weight, a different material, and the like. That is, in the present embodiment, the printing apparatus 10 is configured to be able to print the multiple types of print media S. Since various publicly-known techniques can be used for the cassette accommodating the print medium S, a configuration in which the print medium S accommodated in the cassette is fed to the conveyance portion 12, and the like, descriptions thereof will be omitted.

The printing portion 14 includes a platen 30 that supports the print medium S conveyed by the conveyance portion 12, and a print head 32 that applies ink as a printing agent to the print medium S supported by the platen 30. The print head 32 may be configured to eject ink while moving in a direction intersecting (in the present embodiment, orthogonal to) a conveyance direction in which the print medium S is conveyed (see FIG. 2) or may be configured to eject ink from nozzles arrayed along a length corresponding to the width of the print medium S. In the present embodiment, an optical sensor 24 capable of detecting the print medium S is provided in a position facing the platen 30 on the downstream side of the print head 32 in the conveyance direction.

The fixing portion 16 applies heat to the print medium S after printing performed by the printing portion 14, dries or cures the ink applied to the print medium S, and fixes the ink on the print medium S. The fixing portion 16 is provided with a temperature sensor 34 capable of detecting the temperature in an area through which the print medium S passes. Driving of the fixing portion 16 is controlled based on a result detected by the temperature sensor 34, thereby adjusting the temperature in the area to a set temperature. As described later, the set temperature is a fixation temperature which is for fixing ink and which is set according to the type of print medium S used for job-based printing.

Heat is applied to a print area SA (see FIG. 2) printed by the printing portion 14 between an upstream end 16a and a downstream end 16b of the fixing portion 16 in the conveyance direction in which the print medium S is conveyed. Factors for fixing ink on a print medium include a fixation temperature and time during which heat is applied in the fixing portion 16. In order to fix the applied ink on the print medium S, heat is applied at the fixation temperature for a predetermined period of time. The time during which heat is applied in the fixing portion 16 varies depending on the speed of conveyance by the conveyance portion 12 and a distance L between the upstream end 16a and the downstream end 16b. Thus, the fixation temperature is determined experimentally for each type of printing medium S using, for example, ink used and the printing apparatus 10.

It should be noted that in the present embodiment, the printing apparatus that performs printing using a cut sheet is shown as an example of printing apparatuses. However, the printing apparatus to which the present invention can be applied is not limited to this. The present invention may be applied, for example, to a printing apparatus that prints a sheet-like print medium obtained by unwinding roll paper.

Configuration of a Control System of the Printing Apparatus

Figure 3:
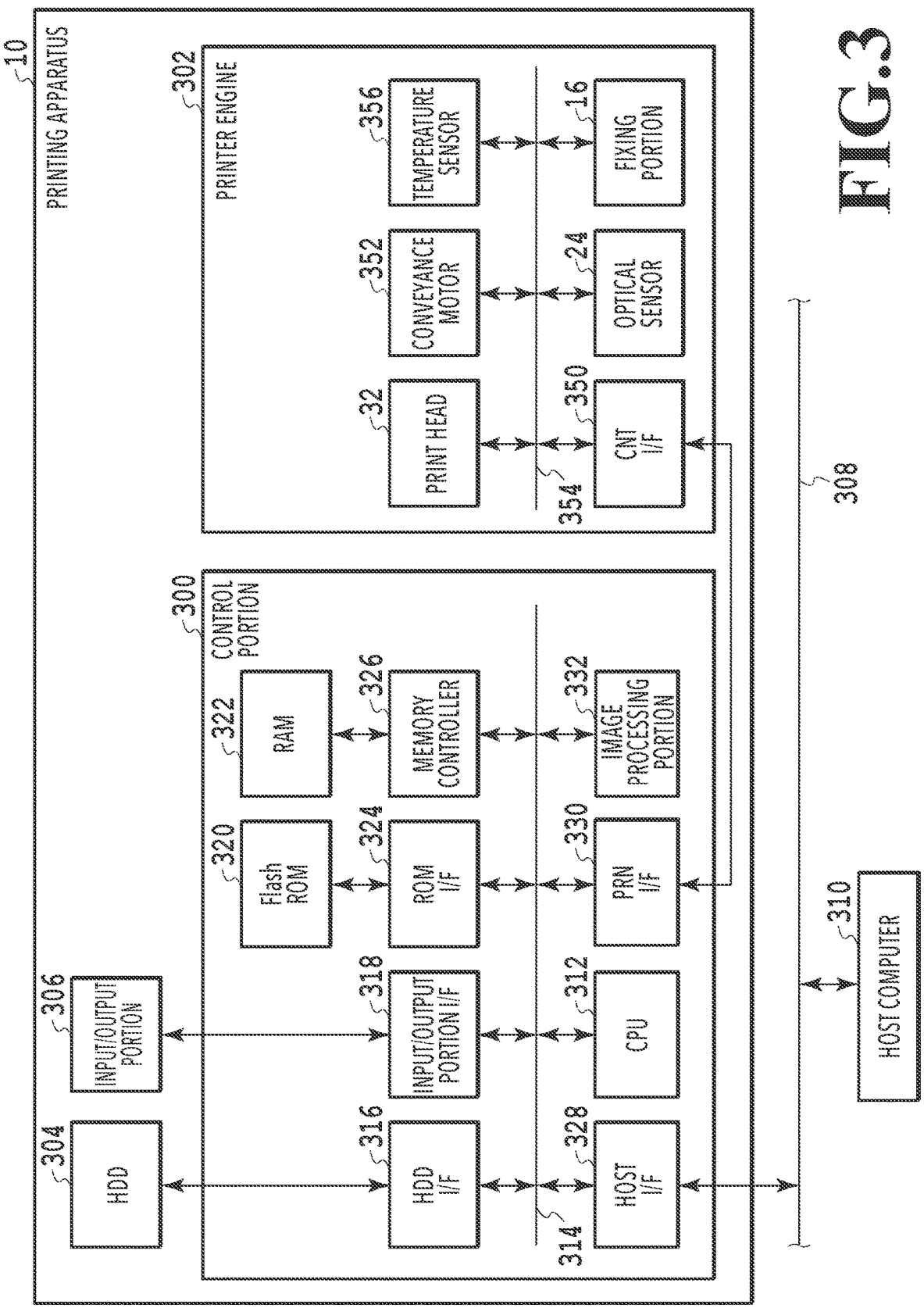
FIG. 3 is a block diagram showing a configuration of a control system of the printing apparatus.

Next, a configuration of a control system of the printing apparatus 10 will be described. FIG. 3 is a block diagram showing the configuration of the control system of the printing apparatus 10. The printing apparatus 10 includes a control portion (print controller) 300 that controls the overall operation of the printing apparatus 10, and a printer engine 302 that executes printing on the print medium S. The printing apparatus 10 also includes an HDD 304 as a storage area, and an input/output portion 306 for notifying the outside of information and inputting information from the outside. It should be noted that the printing apparatus 10 can be connected to a host computer 310 via a network 308.

Control Portion

The control portion 300 includes a central processing unit (CPU) 312 connected to an HDD interface (I/F) 316 and an input/output portion I/F 318 via a system bus 314. Thus, the CPU 312 is connected to the HDD 304 via the HDD I/F 316 and is also connected to the input/output portion 306 via the input/output portion I/F 318. The CPU 312 is a central processing unit in the form of a microprocessor (microcomputer) and controls the overall operation of the printing apparatus 10 by executing a program and using the function of hardware. In the present embodiment, the control portion 300 functions as a print control portion that controls the printing apparatus 10 by performing management processing to be described later.

The control portion 300 includes a Flash ROM 320 that stores a program to be executed by the CPU 312 and various kinds of data necessary for various operations of the printing apparatus 10. The control portion 300 also includes a RAM 322 that is used as a work area for the CPU 312 and also functions using various kinds of setting data as a storage area by, for example, being used as a temporary storage area for various kinds of received data. The flash ROM 320 is connected to the CPU 312 via a ROM I/F 324 and the system bus 314, and the RAM 322 is connected to the CPU 312 via a memory controller 326 and the system bus 314.

The control portion 300 includes a host I/F 328 for being connected to the host computer 310 via the network 308, and the CPU 312 is connected to the host computer 310 via the host I/F 328 and the system bus 314. The control portion 300 is connected to a PRN I/F 330 via the system bus 314, whereby the CPU 312 is connected to the printer engine 302.

The control portion 300 includes an image processing portion 332 that performs various kinds of image processing, and the CPU 312 is connected to the image processing portion 332 via the system bus 314. The image processing portion 332 performs various kinds of publicly-known image processing, such as processing for expanding (converting) print data (e.g., data expressed in a page description language) handled by the printing apparatus 10 into image data (bitmap image data). For example, the image processing portion 332 converts color space (e.g., YCbCr) of image data included in input print data into standard RGB color space (e.g., sRGB). The image processing portion 332 also performs various kinds of image processing of image data as necessary, such as resolution conversion to the effective number of pixels (in which the printing apparatus 10 can perform print processing), image analysis, and image correction. Image data obtained by image processing in the image processing portion 332 is stored, for example, in the RAM 322 or the HDD 304.

Printer Engine

The printer engine 302 performs printing under the control of the CPU 312. The printer engine 302 includes a CNT I/F 350 connected to the PRN I/F 330, and the printer engine 302 is connected to the control portion 300 via the CNT I/F 350. The printer engine 302 also includes the print head 32, a conveyance motor 352, the optical sensor 24, and the fixing portion 16, and the constituents including the CNT I/F 350 are connected to each other via a system bus 354. The printer engine 302 further includes a temperature sensor 356 capable of detecting the temperature in an installation environment where the printing apparatus 10 is installed. The temperature sensor 356 is also connected to the system bus 354. It should be noted that the temperature sensor 356 may be deleted in the case of not using the function of the temperature sensor 356.

The print head 32 ejects ink onto the print medium S to perform printing based on the image data. Further, the print head 32 is, for example, configured to be able to eject inks of a plurality of colors and performs printing by ejecting ink in synchronization with the conveyance of the print medium S. The conveyance motor 352 is a motor for driving, for example, the conveyance rollers 20, 22 that convey the print medium S. The optical sensor 24 is used, for example, as a measuring means for measuring an attribute of the print medium S and is also used for positioning the print medium S. The optical sensor 24 is, for example, a reflective optical sensor including a light emitting element (e.g., an LED), a specular reflected light receiving element, a diffused light receiving element, and the like. The printing apparatus 10 uses the optical sensor 24 and can measure attribute values such as the intensity of specular reflected light and diffuse reflected light of the print medium S supported by the platen 30, and the thickness of the print medium S. The fixing portion 16 applies heat to the print medium S after printing, thereby curing ink on the print medium S by drying the ink or the like to fix the ink on the print medium S.

HDD and Input/Output Portion

The HDD 304 is a non-volatile storage area and is configured to be able to store and read a program executed by the CPU 312, print data, and setting information necessary for the various operations of the printing apparatus 10. It should be noted that the printing apparatus 10 may use a publicly-known mass storage device such as a flash memory instead of the HDD 304. The input/output portion 306 includes a hard key and a panel for a user to perform various operations and also includes a display portion for displaying (notifying) various kinds of information to the user. It should be noted that the input/output portion 306 may be configured to notify the user of information by outputting sound such as a buzzer or audio based on sound information from an audio generator.

It should be noted that in the present embodiment, the input/output portion 318 is provided in the printing apparatus 10, but the present invention is not limited to this. For example, an input/output device having a function equivalent to that of the input/output portion 318 may be connected to the printing apparatus 10 via the network 308 without providing the input/output portion 318. Alternatively, the host computer 310 may also function as the input/output portion 318. Further, the input/output device may be connected to the printing apparatus 10 via the network 308 while the printing apparatus 10 may be provided with the input/output portion 318.

The host computer 310 is, for example, an external device that serves as a print data supply source, and is installed with a printer driver. The printing apparatus 10 may be connected via the network 308 to a data providing device that serves as a print data supply source, such as an image reading reader, a digital camera, or a smartphone, instead of the host computer 310. It should be noted that the printing apparatus 10 and an external device including the above data providing device or the like do not necessarily have to be connected via the network 308, but may be directly connected, for example, via wireless communication.

Job List Creation

Figure 4:
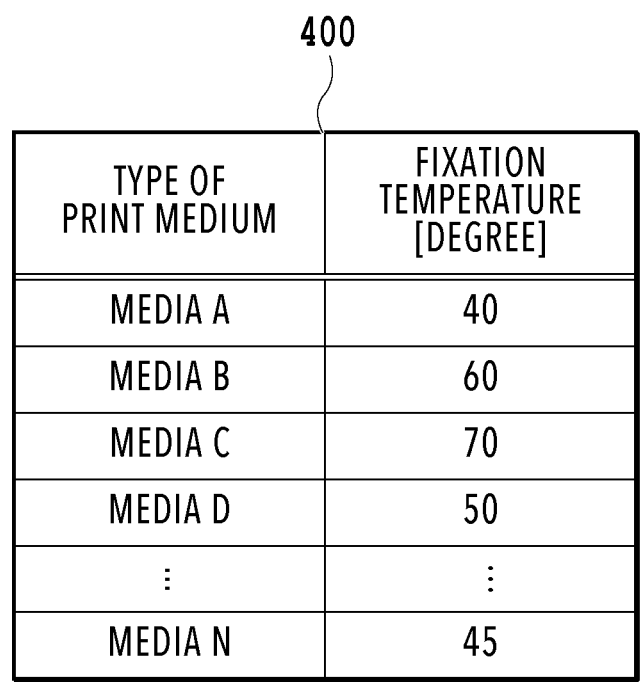
FIG. 4 is a table showing fixation temperatures corresponding to the types of print media.

In the above configuration, in a case where a user inputs a job to the printing apparatus 10 via the host computer 310, the input/output portion 306, or the like, the printing apparatus 10 creates a job list showing order in which printing is executed according to the input job (also referred to as job execution order). The creation of the job list refers to a table 400 that is stored in a storage area of the printing apparatus 10, such as the HDD 304, and in which an ink fixation temperature is associated with each type of print medium S (see FIG. 4). FIG. 4 is a diagram showing an example of the table 400 in which a fixation temperature is associated with each type of print medium S.

The fixation temperature associated with the print medium S is a temperature for fixing ink used on the print medium S, and is set for each type of print medium S. As described above, a fixation temperature for each type of print medium S is, for example, determined experimentally. In a case where printing is performed in a state where temperature in the fixing portion 16 is higher than fixation temperature in the print medium S, there is a possibility that the print medium S may be deformed with heat. On the other hand, in a case where printing is performed in a state where the temperature in the fixing portion 16 is lower than the fixation temperature in the print medium S, there is a possibility that ink will not be fixed on the print medium S.

The printing apparatus 10 executes printing based on each job in order based on the created job list. The printing based on each job is started in a case where the temperature in the fixing portion 16 (that is, a temperature detected by the temperature sensor 34) reaches a fixation temperature set for each print medium S used for job-based printing. That is, in the case of executing a job whose turn has come, the fixing portion 16 performs preheating or heat dissipation, and in a case where the temperature detected by the temperature sensor 34 reaches the fixation temperature in the print medium S used for the job, printing based on the job is executed.

Here, it is assumed that a job list is created in order in which the jobs are input. Since fixation temperatures vary depending on the print media S, in this case, preheating and heat dissipation must be repeatedly performed in the fixing portion 16, which may increase time required for printing based on the job list. In other words, in the case of printing based on a next job, the amount of heat preheated and dissipated in the fixing portion 16 may increase, time until the next fixation temperature is reached may increase, and the total amount of printing time according to the job list may increase. Thus, in the present embodiment, in the creation processing for creating a job list, jobs are arranged so that fixation temperatures in the print media S used are in ascending or descending order so that preheating and heat dissipation are efficiently performed in the fixing portion 16.

Creation Processing

Figure 5:
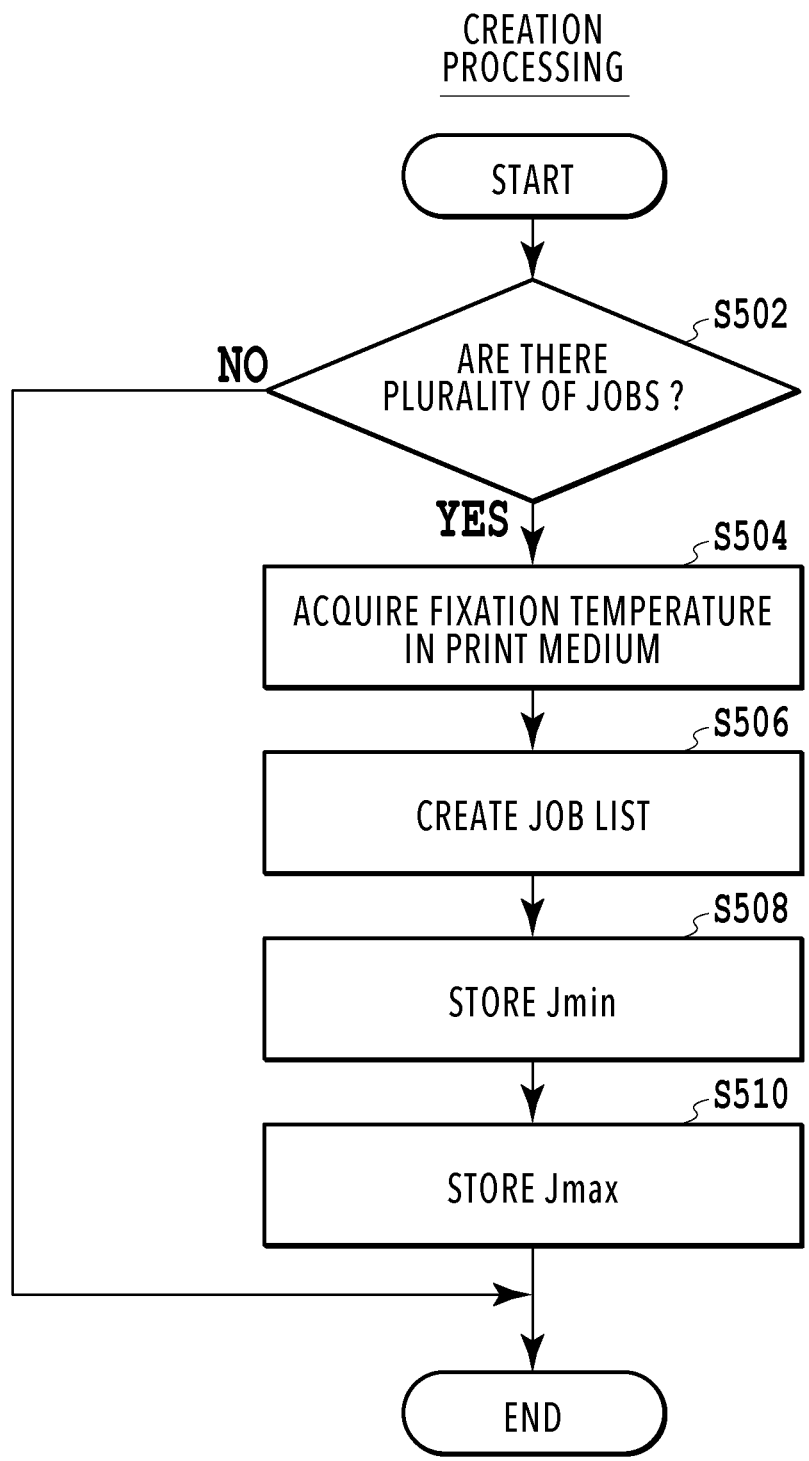
FIG. 5 is a flowchart showing the processing contents of creation processing.

A description will be given of creation processing for creating a job list showing job execution order with reference to FIG. 5. FIG. 5 is a flowchart showing the detailed processing contents of the creation processing for creating a job list. The process in the present flowchart is started based on a job being input in a standby state where the printing apparatus 10 is not executing printing. Hereinafter, a job input during the standby state will also be referred to as "second job." Incidentally, a series of steps shown in the flowchart in FIG. 5 is performed by the CPU 312 expanding a program code stored in the Flash ROM 320 into the RAM 322 and executing the program code. Alternatively, a portion or all of the functions of the steps in FIG. 5 may be executed in hardware such as an ASIC or an electrical circuit. It should be noted that a symbol S in the description of each process means a step in the flowchart.

In a case where the creation processing is started, first, the CPU 312 determines in S502 whether there are a plurality of input jobs. If the CPU 312 determines in S502 that a plurality of jobs are not input, the CPU 312 finishes the creation processing according to the flowchart in FIG. 5. If the CPU 312 determines in S502 that there are a plurality of input jobs, the process proceeds to S504, and the CPU 312 acquires an ink fixation temperature in the print medium S used for a job.

In S504, a fixation temperature corresponding to the type of print medium S used for a job is acquired with reference to the table 400 stored in the storage area and showing ink fixation temperatures for the print media S. In S506, the CPU 312 then creates a job list by arranging the jobs so that the fixation temperatures are in ascending order. That is, the job list is created by arranging the jobs in order so that the lower a job is listed in the job list, the higher a fixation temperature becomes. It should be noted that in the present embodiment, the job list is created by arranging jobs so that fixation temperatures are in ascending order in S506, but the present invention is not limited to this. The job list may be created by arranging the jobs so that the fixation temperatures are in descending order based on an installation environment, the fixation temperatures, and the like. As described above, in the present embodiment, the CPU 312 functions as a determination portion that determines, based on the fixation temperatures, the execution order for the second job input during the standby state.

In S508, the CPU 312 then stores a job to which a job number corresponding to the lowest fixation temperature is applied as Jmin. In S510, the CPU 312 also stores a job to which a job number corresponding to the highest fixation temperature is applied as Jmax and finishes the creation processing according to the flowchart in FIG. 5. Here, it is assumed that a job list including n jobs is created in the creation processing. In the present embodiment, the jobs are arranged so that fixation temperatures are in ascending order. Thus, in S508, job No. 1 is a job stored as Jmin in the RAM 322 or the like and job No. n is a job stored as Jmax in the RAM 322 or the like. It should be noted that in a case where the jobs are arranged so that the fixation temperatures are in descending order, job No. n is a job stored as Jmin in the RAM 322 or the like in S508, and job No. 1 is a job stored as Jmax in the RAM 322 or the like in S510.

Job List Updating

After creating the job list, in a case where a user inputs an instruction to start printing, print processing for executing printing based on each job is performed according to job execution order in the job list. Here, it is assumed that a new job is input during execution of the print processing. In this case, in a case where the newly added job is executed after each job in the job list is finished, there is a possibility that preheating or heat dissipation must be performed depending on the fixation temperature in the print medium S used for the job. Thus, in the present embodiment, in a case where a new job is input during the print processing, a job that has not yet been executed (hereinafter also referred to as "unexecuted job") in the job list and the newly added job are rearranged in execution order to update the job list.

Outline of Job Rearrangement

A description will be given of the outline of job rearrangement in updating the job list with reference to FIGS. 6A to 6F. FIGS. 6A to 6F are diagrams for explaining the outline of job rearrangement in updating the job list. It should be noted that a job number in the job list is associated with information specifying a job. In the present embodiment, the job list shows the type of print medium used for a job corresponding to a job number and a fixation temperature in the print medium. Information included in the job list is not limited to the above information and is added or deleted as appropriate. The job list in FIGS. 6A to 6F shows "job numbers" as serial numbers given in execution order, "the types of print media," and "fixation temperatures" in order from the left to the right of the list.

FIG. 6A shows a job list 602 in which five jobs numbered 1 to 5 are arranged so that fixation temperatures are in ascending order. In the job list 602, a finished job is displayed darkly, and a job currently being executed or to be executed is displayed brightly. That is, in FIG. 6A, job No. 1 is a job finished, job No. 2 is a job currently being executed, and jobs No. 3 to No. 5 are jobs to be executed in the future. It is assumed that in this state, three jobs in FIG. 6B are additionally input. Fixation temperatures in the three added jobs are 40 degrees (additional job 1), 70 degrees (additional job 2), and 50 degrees (additional job 3), which are equal to or higher than the fixation temperature in the job currently being executed. In this case, jobs No. 3 to No. 5 in the job list 602 and the three additional jobs are rearranged in ascending order to generate an updated job list 604 (see FIG. 6C). It should be noted that in the generated job list, a job number for a job before the job currently being executed is unchanged.

In the generated job list 604, among jobs after job No. 2 currently being executed, job No. 3 is an additional job 1, job No. 4 is an additional job 2, and job No. 5 is old job No. 3. It should be noted that an old job number is a job number in the job list before the update. Further, job No. 6 is old job No. 4, job No. 7 is old job No. 5, and job No. 8 is an additional job 3. This eliminates the need for providing standby time for heat dissipation in executing printing based on a new job and enables efficiently executing printing based on each job.

Further, FIG. 6D shows a job list 606 in which five jobs numbered 1 to 5 are arranged so that fixation temperatures are in ascending order. In the job list 606, a finished job is displayed darkly, and a job currently being executed or to be executed is displayed brightly as in FIG. 6A. That is, in FIG. 6D, jobs No. 1 to No. 3 are jobs finished, job No. 4 is a job currently being executed, and job No. 5 is a job to be executed in the future. It is assumed that in this state, three jobs in FIG. 6E are added. Fixation temperatures in the three added jobs are 40 degrees (additional job A), 70 degrees (additional job B), and 50 degrees (additional job C), which are lower than the fixation temperature in the job currently being executed or higher than the fixation temperature. In this case, the three additional jobs are added and arranged in descending order below job No. 5 in the job list 606 to generate an updated job list 608 (see FIG. 6F).

In the generated job list 608, among jobs after job No. 4 currently being executed, job No. 5 is old job No. 5. Further, job No. 6 is an additional job B, job No. 7 is an additional job C, and job No. 8 is an additional job A. This eliminates the need for performing preheating in executing printing based on a new job in jobs No. 6 to No. 8 after executing the job at the highest fixation temperature and enables efficiently executing printing based on each job.

Management Processing

Next, a description will be given in detail of processing actually executed by the printing apparatus 10 in a case where a new job is additionally input. In the printing apparatus 10, in order to manage job execution order based on a job list, in a case where print processing is started, management processing for managing the job execution order in the job list is executed in parallel with the print processing. That is, in a case where the printing apparatus 10 enters a printing state where printing is performed based on a job from a standby state, the management processing is started.

Figure 7:
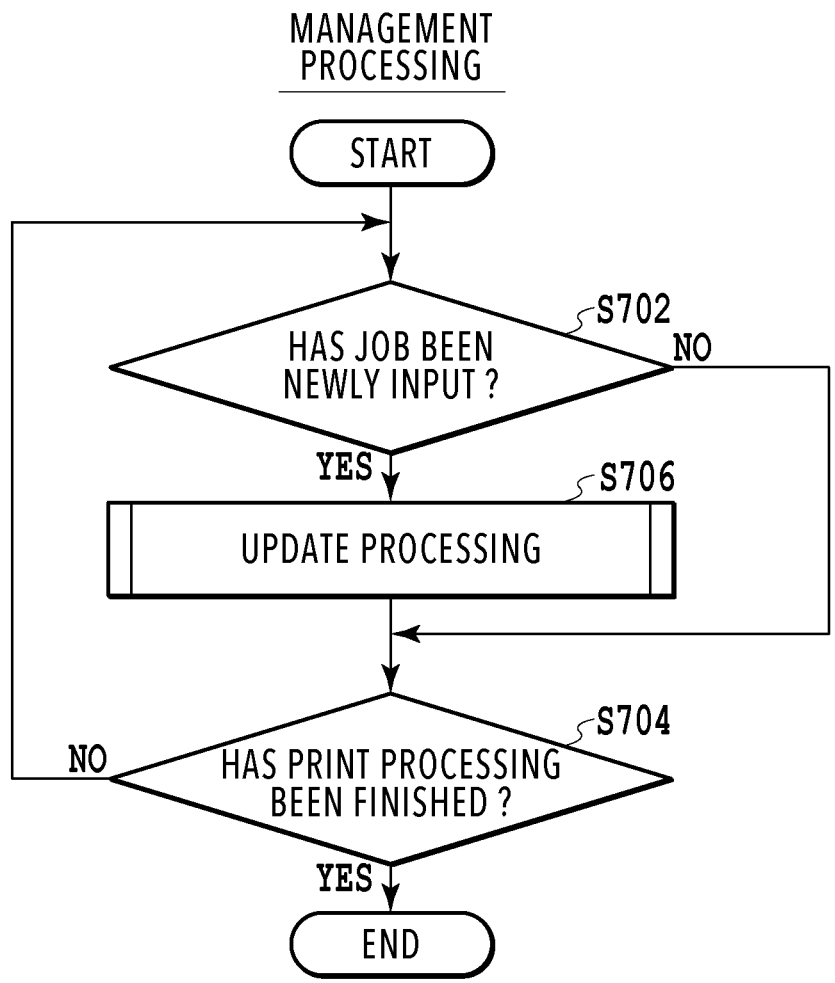
FIG. 7 is a flowchart showing the processing contents of management processing.
Figure 8:
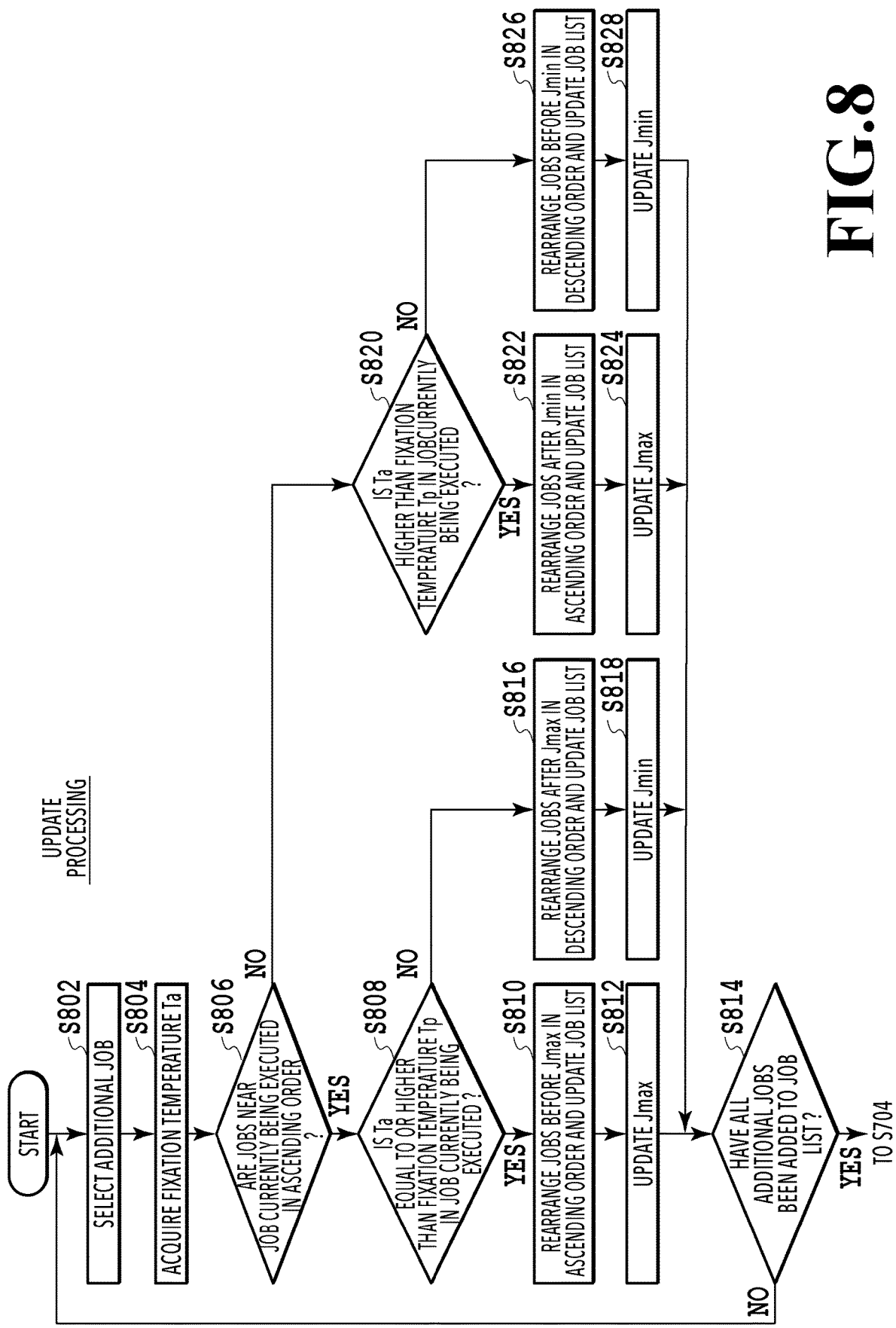
FIG. 8 is a flowchart showing the processing contents of update processing which is a subroutine of the management processing.

FIG. 7 is a flowchart showing the detailed processing contents of the management processing. FIG. 8 is a flowchart showing the detailed processing contents of update processing which is the subroutine of FIG. 7. Series of steps shown in the flowcharts in FIGS. 7 and 8 are performed by the CPU 312 expanding a program code stored in the Flash ROM 320 into the RAM 322 and executing the program code. Alternatively, a portion or all of the functions of the steps in FIGS. 7 and 8 may be executed in hardware such as an ASIC or an electrical circuit.

In a case where the management processing is started, the CPU 312 first determines in S702 whether a new job has been added. In S702, in a case where the CPU 312 receives a new job input from the input/output portion 306 or the like during execution of printing in a job in the job list, the CPU 312 determines that a new job has been added. As described above, in the present embodiment, the CPU 312 functions as a reception portion that receives a job. If the CPU 312 determines in step S702 that no new job has been added, the process proceeds to S704, and the CPU 312 determines whether the print processing has been finished. If the CPU 312 determines in S704 that the print processing has not been finished, the process returns to S702. Further, if the CPU 312 determines in S704 that the print processing has been finished, the management processing according to the flowchart in FIG. 7 is finished.

Further, if the CPU 312 determines in S702 that a new job has been added, in S706, the CPU 312 executes the update processing for updating the job list by rearranging the execution order of jobs that have not yet been executed and the newly added job. The update processing executed in S706 will be described in detail below with reference to FIG. 8.

In a case where the update processing is started, in S802, the CPU 312 first selects an additional job that has not yet been added to the job list from among the newly added additional jobs (hereinafter also referred to as "first jobs"). Next, in S804, the CPU 312 acquires a fixation temperature Ta in the additional job selected in S802. In S804, a fixation temperature in the print medium S used for printing based on the additional job is acquired with reference to the table 400 that is stored in a storage area such as the HDD 304 and shows an ink fixation temperature for each type of print medium S. As described above, in the present embodiment, the CPU 312 functions as an acquisition portion that acquires a fixation temperature in the print medium S used for an input job.

In S806, the CPU 312 then determines whether jobs near the job currently being executed are arranged in ascending order in the job list. In S806, the determination is made, for example, by comparing a fixation temperature Tp in the job being executed at the time of processing in S806 with a fixation temperature in a job to be executed after the job in the job list. Specifically, in a case where among jobs to be executed after the job currently being executed, a fixation temperature in a job in which the fixation temperature varies immediately near the job currently being executed is higher than the fixation temperature Tp in the job currently being executed, it is determined that the jobs are arranged in ascending order. On the other hand, in a case where among the jobs to be executed after the job currently being executed, a fixation temperature in the job in which the fixation temperature varies immediately near the job currently being executed is lower than the fixation temperature Tp in the job currently being executed, it is determined that the jobs are arranged in descending order, that is, the jobs are not arranged in ascending order.

If the CPU 312 determines in S806 that the jobs near the job currently being executed in the job list are arranged in ascending order, the process proceeds to S808. In S808, the CPU 312 determines whether the fixation temperature Ta in the additional job is equal to or higher than the fixation temperature Tp in the job currently being executed. It should be noted that it is determined in S808 whether the fixation temperature Ta is equal to or higher than the fixation temperature Tp, but the present invention is not limited to this. It may also be determined whether the fixation temperature Ta in the additional job is equal to or higher than the temperature in the fixing portion 16 at the time of processing in S808, that is, a temperature detected by the temperature sensor 34.

If the CPU 312 determines in S808 that the fixation temperature Ta in the additional job is equal to or higher than the fixation temperature Tp in the job currently being executed, the process proceeds to S810. In S810, the CPU 312 rearranges jobs before Jmax, which is a job number corresponding to the highest fixation temperature, so that fixation temperatures are in ascending order and updates the job list. At this time, since the jobs before the Jmax are rearranged in ascending order, there is a possibility that the fixation temperature Ta in the additional job will be the highest fixation temperature. Thus, after the processing in S810, in S812, the CPU 312 updates the Jmax, which is a job number corresponding to the highest fixation temperature.

In S814, the CPU 312 then determines whether all additional jobs have been added to the job list. In S814, for example, it is determined whether the steps from S802 onward have been executed for all input additional jobs. If the CPU 312 determines in S814 that all additional jobs have not been added to the job list, the process returns to S802. Further, if the CPU 312 determines in S814 that all additional jobs have been added to the job list, the process proceeds to S704 in FIG. 7.

If the CPU 312 determines in S808 that the fixation temperature Ta in the additional job is not equal to or higher than the fixation temperature Tp in the job currently being executed, the process proceeds to S816. In S816, the CPU 312 rearranges jobs after the Jmax, which is a job number corresponding to the highest fixation temperature, so that fixation temperatures are in descending order and updates the job list. It should be noted that in a case where there is no job after the Jmax, an additional job is simply added after the Jmax in S816. After that, in S818, the CPU 312 updates Jmin, which is a job number corresponding to the lowest fixation temperature, and the process proceeds to S814. In S818, the job at the lowest fixation temperature among the jobs after the Jmax is set as the Jmin.

On the other hand, if the CPU 312 determines in S806 that the jobs near the job currently being executed in the job list are not arranged in ascending order, that is, are arranged in descending order, the process proceeds to S820. In S820, the CPU 312 determines whether the fixation temperature Ta in the additional job is higher than the fixation temperature Tp in the job currently being executed. It should be noted that it is determined in S820 whether the fixation temperature Ta is higher than the fixation temperature Tp, but the present invention is not limited to this. It may also be determined whether the fixation temperature Ta in the additional job is higher than the temperature in the fixing portion 16 at the time of processing in S820, that is, the temperature detected by the temperature sensor 34.

If the CPU 312 determines in S820 that the fixation temperature Ta in the additional job is higher than the fixation temperature Tp in the job currently being executed, the process proceeds to S822. In S822, the CPU 312 rearranges jobs after the Jmin, which is a job number corresponding to the lowest fixation temperature, so that fixation temperatures are in ascending order and updates the job list. It should be noted that in a case where there is no job after the Jmin, an additional job is simply added after the Jmin in S822. After that, in S824, the CPU 312 updates the Jmax, which is a job number corresponding to the highest fixation temperature, and the process proceeds to S814. In S824, the job at the highest fixation temperature among the jobs after the Jmin is set as the Jmax.

If the CPU 312 determines in S820 that the fixation temperature Ta in the additional job is not higher than the fixation temperature Tp in the job currently being executed, that is, is equal to or lower than the fixation temperature Tp, the process proceeds to S826. In S826, the CPU 312 rearranges jobs before the Jmin, which is a job number corresponding to the lowest fixation temperature, so that fixation temperatures are in descending order and updates the job list. At this time, since the jobs before the Jmin are rearranged in descending order, there is a possibility that the fixation temperature Ta in the additional job will be the lowest fixation temperature. Thus, after the processing in S826, in S828, the CPU 312 updates the Jmin, which is a job number corresponding to the lowest fixation temperature, and the process proceeds to S814. As described above, in the present embodiment, the CPU 312 functions as an updating portion that adds the first job input during printing to unexecuted jobs based on the fixation temperature and updates the execution order.

As described above, in the case of executing a plurality of jobs, the printing apparatus 10 creates a job list such that ink fixation temperatures in the print media S used for jobs are in ascending order or descending order. In a case where a new job is added during execution of job-based printing based on the job list, unexecuted jobs and the newly added job in the job list are rearranged based on the fixation temperatures. At this time, the arrangement is made so that preheating and heat dissipation are performed efficiently in the fixing portion 16 at the time of printing based on a next job. As a result, even in a case where a new job is added during execution of job-based printing, the printing apparatus 10 can execute printing efficiently, and time required for printing can be reduced.

Second Embodiment

Next, a description will be given of an example of a print control device according to the second embodiment by taking a printing apparatus including the print control device as an example with reference to FIG. 9. It should be noted that in the following description, detailed descriptions of constituents identical or corresponding to those of the printing apparatus described in the first embodiment will be omitted by using reference numerals identical to those used in the first embodiment.

The second embodiment is different from the first embodiment described above in that a mode of rearranging jobs in a job list created in the creation processing is determined according to an installation environment where the printing apparatus 10 is installed. In a case where the temperature in the installation environment is low, it takes longer to perform preheating to a fixation temperature as compared to a case where the temperature in the installation environment is high. Further, in a case where the temperature in the installation environment is high, it takes longer to dissipate heat to reach the fixation temperature as compared to a case where the temperature in the installation environment is low. Thus, in the present embodiment, before executing the creation processing, determination processing for determining a mode that indicates an arrangement of jobs according to the temperature in the installation environment in creating a job list is executed. Modes determined in the determination processing include an ascending order mode in which jobs are arranged in ascending order and a descending order mode in which jobs are arranged in descending order. The determination processing will be described in detail below.

Figure 9:
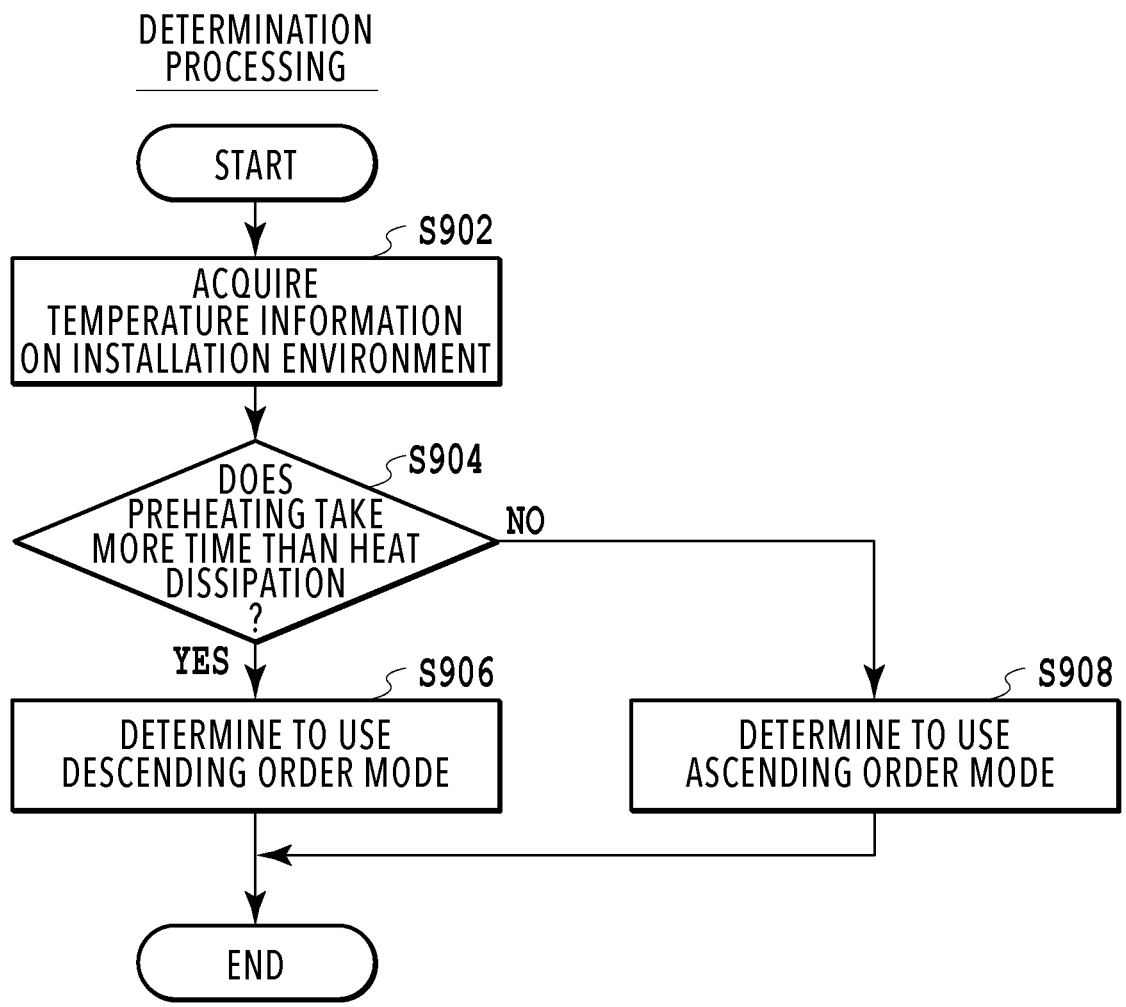
FIG. 9 is a flowchart showing the processing contents of determination processing.

FIG. 9 is a flowchart showing the detailed processing contents of the determination processing for determining a mode to be applied at the time of job list creation. A series of steps shown in the flowchart in FIG. 9 is performed by the CPU 312 expanding a program code stored in the Flash ROM 320 into the RAM 322 and executing the program code. Alternatively, a portion or all of the functions of the steps in FIG. 9 may be executed in hardware such as an ASIC or an electrical circuit. It should be noted that the determination processing is executed, for example, after receiving an instruction to create a job list from a user and before executing the creation processing.

In a case where the determination processing is started, in S902, the CPU 312 first acquires temperature information on the installation environment where the printing apparatus 10 is installed. The printing apparatus 10 is provided, for example, with a temperature sensor 356 capable of measuring the temperature in the installation environment. Accordingly, in S902, the temperature information detected by the temperature sensor 356 is acquired. As described above, in the present embodiment, the temperature sensor 356 functions as a detection portion that detects the temperature in a print environment.

Next, the CPU 312 determines in S904 whether time required for preheating by the fixing portion 16 is longer than time required for heat dissipation in the fixing portion 16. Specifically, in S904, for example, time required to increase the fixation temperature from a minimum value to a maximum value is calculated based on the acquired temperature information. The calculated value corresponds to the time required for preheating. Further, time required to decrease the fixation temperature from the maximum value to the minimum value is calculated based on the acquired temperature information. The calculated value corresponds to the time required for heat dissipation. It should be noted that these calculations are performed using, for example, a pre-stored equation using a value corresponding to the temperature information as a variable. Further the minimum value and the maximum value of the fixation temperature are, for example, the minimum value and the maximum value of the fixation temperature in the predetermined print medium S usable in the printing apparatus 10 with reference to the table 400. It should be noted that such a method of calculating time required for preheating and time required for heat dissipation is just an example, and various publicly-known techniques can be used for the calculation method. Further, the calculation method may use not only temperature information but also humidity information in the installation environment of the printing apparatus 10. In this case, the temperature sensor capable of measuring the temperature in the installation environment of the printing apparatus 10 is configured to be able to also detect humidity. Further, the above calculation method may also use temperature information on the fixing portion 16.

In a case where the CPU 312 determines in S904 that time required for preheating is longer than time required for heat dissipation, it is determined that printing can be performed more efficiently in the case of decreasing the fixation temperature according to the job from the state where the temperature is initially increased. In other words, it is determined that time required for printing is reduced in a case where the jobs are arranged in descending order. Accordingly, in this case, the CPU 312 determines in S906 to use the descending order mode, and the determination processing according to the flowchart in FIG. 9 is finished. On the other hand, in a case where the CPU 312 determines in S904 that the time required for preheating is not longer than the time required for heat dissipation, that is, the time required for heat dissipation is longer, it is determined that printing can be performed more efficiently by increasing the fixation temperature according to the job from room temperature. That is, it is determined that the time required for printing is reduced in a case where the jobs are arranged in ascending order. Accordingly, in this case, the CPU 312 determines in S908 to use the ascending order mode, and the determination processing according to the flowchart in FIG. 9 is finished.

In the creation processing executed afterward, in the case of creating a job list in the processing in S506, the jobs are arranged in ascending order or descending order based on the mode determined in the determination processing.

As described above, in the present embodiment, an arrangement of jobs at the time of job list creation is determined according to the installation environment of the printing apparatus 10. This makes it possible to create a job list by arranging the jobs according to the installation environment. Thus, the user does not need to consider the fixation temperature in a print medium, preheating, heat dissipation, and the like. Therefore, in the present embodiment, in addition to the functions and effects produced by the first embodiment, workability for a user is increased.

OTHER EMBODIMENTS

Incidentally, the above embodiments may be modified as shown in (1) to (4) below.

(1) Although not specifically described in the second embodiment, the user may input a time to start printing in advance at the time of job list creation. This makes it possible to preheat the fixing portion 16 to the fixation temperature in job No. 1 in the job list by the input time and reduce time required for printing.

(2) In the above embodiments, in a case where a new first job is input during printing executed in the execution order in the job list created in the creation processing, unexecuted jobs and the first job are rearranged based on the fixation temperatures to update the execution order. However, the present invention is not limited to this. For example, the job list may be input from the input/output portion 306, the host computer 310, or the like. At this time, the fixation temperature in each job in the job list may be input together with the job list, or the CPU 312 may use the table 400 to acquire the fixation temperature in each job in the job list.

(3) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(4) The above embodiments and the various modes shown in (1) and (3) above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-031117, filed Mar. 1, 2023, which is hereby incorporated by reference herein in its entirety.

What is claimed is:

1. A print control device comprising:
   a reception unit configured to receive a job to execute printing on a print medium;
   an acquisition unit configured to acquire a fixation temperature for fixing a printing agent to the print medium used for the job received by the reception unit; and
   an update unit configured to update an execution order by adding, to an unexecuted job, a first job received by the reception unit during execution of the job according to the execution order based on the fixation temperature in the unexecuted job which is the job that has not yet been executed in the execution order, and the fixation temperature in the first job acquired by the acquisition unit.

2. The print control device according to claim 1, wherein the update unit updates the execution order by rearranging the first job and the unexecuted job so that preheating and heat dissipation based on the fixation temperature are executed efficiently.

3. The print control device according to claim 1, wherein in a case where the execution order of jobs near the job currently being executed is ascending order, the update unit rearranges the job which is the unexecuted job and which is before the job in which the fixation temperature is at a maximum and the first job in ascending order in a case where the fixation temperature in the first job is equal to or higher than the fixation temperature in the job currently being executed, and rearranges the job which is the unexecuted job and which is after the job in which the fixation temperature is at a maximum and the first job in descending order in a case where the fixation temperature in the first job is lower than the fixation temperature in the job currently being executed.

4. The print control device according to claim 1, wherein in a case where the execution order of jobs near the job currently being executed is descending order, the update unit rearranges the job which is the unexecuted job and which is after the job in which the fixation temperature is at a minimum and the first job in ascending order in a case where the fixation temperature in the first job is higher than the fixation temperature in the job currently being executed, and rearranges the job which is the unexecuted job and which is before the job in which the fixation temperature is at a minimum and the first job in descending order in a case where the fixation temperature in the first job is equal to or lower than the fixation temperature in the job currently being executed.

5. The print control device according to claim 1, further comprising:
a determination unit configured to determine the execution order for a second job received by the reception unit in a standby state where printing is not executed based on the fixation temperature in the second job acquired by the acquisition unit.

6. The print control device according to claim 5, wherein the determination unit determines the execution order based on the fixation temperature in the second job acquired by the acquisition unit so that the fixation temperatures are in ascending or descending order.

7. The print control device according to claim 6, wherein the determination unit determines, in a case where preheating needs more time than heat dissipation, the execution order so that the fixation temperatures are in descending order, and determines, in a case where heat dissipation needs more time than preheating, the execution order so that the fixation temperatures are in ascending order.

8. The print control device according to claim 7, further comprising:
a detection unit configured to detect a temperature in a print environment,
wherein the determination unit determines whether preheating needs more time than heat dissipation based on the temperature detected by the detection unit.

9. The print control device according to claim 1, further comprising:
a conveyance unit configured to convey a print medium;
a printing unit configured to print the print medium conveyed by the conveyance unit using a printing agent;
a fixing unit configured to apply heat to the print medium printed by the printing unit to fix the printing agent to the print medium; and
a control unit configured to control the conveyance unit and the printing unit based on the job in the execution order and control the fixing unit based on the fixation temperature in the job.

10. A print control method comprising:
while a job for executing printing on a print medium is executed according to an execution order, receiving a first job which is the new job;
acquiring a fixation temperature for fixing a printing agent to the print medium used for the first job received in the receiving; and
updating the execution order by adding the first job to an unexecuted job based on the fixation temperature in the unexecuted job which is the job that has not yet been executed in the execution order and the fixation temperature in the first job.

11. A non-transitory computer readable storage medium storing a program for causing a computer to function as a print control device, the print control device comprising:
a reception unit configured to receive a job to execute printing on a print medium;
an acquisition unit configured to acquire a fixation temperature for fixing a printing agent to the print medium used for the job received by the reception unit; and
an update unit configured to update an execution order by adding, to an unexecuted job, a first job received by the reception unit during execution of the job according to the execution order based on the fixation temperature in the unexecuted job which is the job that has not yet been executed in the execution order and the fixation temperature in the first job acquired by the acquisition unit.

* * * * *